United States Patent Office 3,824,259
Patented July 16, 1974

3,824,259
SULPHUR-CONTAINING EPOXIDES
Richard Alan Oswald, Sawston, and Bernard Peter Stark, Stapleford, England, assignors to Ciba-Geigy Limited, Basel, Switzerland
No Drawing. Continuation-in-part of abandoned application Ser. No. 769,390, Oct. 21, 1968. This application Dec. 9, 1970, Ser. No. 96,676
Claims priority, application Great Britain, Oct. 26, 1967, 48,798/67
Int. Cl. C07d 1/20
U.S. Cl. 260—348 R          5 Claims

ABSTRACT OF THE DISCLOSURE

Compounds containing, per molecule, at least one end at most three groups of formula $$-SCH_2CH\underset{O}{\overset{}{\diagdown\diagup}}CH_2$$

attached to a carbon atom of an aliphatic chain or a cycloaliphatic nucleus. The compounds are prepared by reaction of a monothiol (I) of formula $$HS-CH_2CH-CH_2Cl$$
$$\quad\quad\quad\;\;|$$
$$\quad\quad\quad\;\;OR^1$$

where $OR^1$ is a hydroxyl group or an ester group, with a compound (II) containing at least one ethylenic double bond, when $OR^1$ represents an ester group hydrolysing this group to a hydroxyl group; and dehydrochlorinating the intermediary 1,2-chlorohydrin so obtained to form the 1,2-epoxide. These compounds may be used to stabilize chlorine-containing organic resins such as polyvinyl chloride against the degradative effects of heat and light. When used in conjunction with a curing agent, these compounds may be used to prepare coating and adhesive resins.

---

This application is a continuation-in-part of our application, Ser. No. 769,390, filed Oct. 21, 1968, which is now abandoned.

This invention relates of sulphur-containing 1,2-epoxides.

Epoxide resins, i.e. substances containing on average more than one 1,2-epoxide group per molecule, may react with cross-linking agents such as dicarboxylic acid anhydrides, or may be induced to polymerise through the agency of catalysts such as tertiary amines, to form insoluble, infusible materials having valuable technical properties. Mono-1,2-epoxides may also be converted into useful products by means of agents which are at least trifunctional with respect to the epoxide group, such as tetracarboxylic acid dianhydrides, or which induce polymerisation.

Methods presently available for preparing 1,2-epoxide compounds are not entirely satisfactory.

One procedure involves reaction of an alcoholic or phenolic hydroxyl group with epichlorohydrin in the presence of a catalyst, followed by dehydrochlorination. The first stage, particularly when polyhydric alcohols are used, is inefficient, and frequently only a proportion of the hydroxyl groups is converted into 1,2-chlorohydrin groups. Further, impurities containing non-hydrolysable chlorine (i.e. chlorine present other than as a 1,2-chlorohydrin group) may be formed, possibly by reactions such as (where QOH represents the alcohol or phenol)

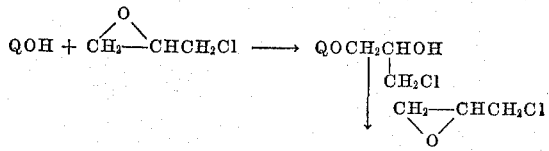

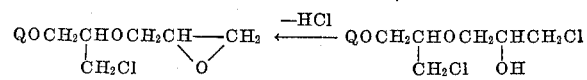

Such impurities may deleteriously affect the electrical properties of epoxide resins.

Alcohols or phenols may also be treated with glycerol α-monochlorohydrin, as illustrated by the equations

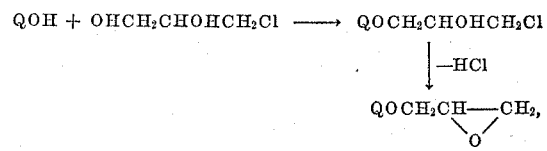

but the secondary hydroxyl group in glycerol α-monochlorohydrin may react, giving rise to a 1,3-chlorohydrin (which cannot be directly converted into a 1,2-epoxide), or both the primary and secondary hydroxyls may react, linking two molecules of the QOH component: this linking may be undesirable since less soluble, and even gelled, products may be formed.

A similar procedure comprises reaction of an alcohol or phenol with glycerol-1,3-dichlorohydrin in the presence of alkali. This method is open to the objection that epichlorohydrin may be formed and react with the secondary hydroxyl in the 3-chloro-2-hydroxypropoxy group, again giving products containing non-hydrolysable chlorine.

A fourth procedure involves direct epoxidation of ethylenically unsaturated compounds by means of peracids. This, in general, only proceeds satisfactorily when the double bonds are not terminal, but non-terminal epoxides have low reactivity, particularly towards amines. To obtain products having the more reactive terminal 1,2-epoxy groups, i.e. those containing the group

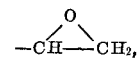

specially reactive, expensive peracids have to be used.

A fifth procedure comprises addition of hypochlorous acid to ethylenically unsaturated compounds, followed by dehydrochlorination. This method too gives chlorine-containing by-products, e.g. by a reaction such as the following, where $Q^1OH$ denotes an alcohol (which may be the desired chlorohydrin intermediate or which may be present as solvent)

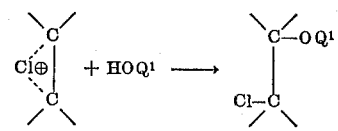

We have found that, by addition of certain thiol-containing 1,2-chlorohydrins to ethylenic double bonds of olefines, followed by dehydrochlorination, these olefines may be converted into sulphur-containing 1,2-epoxides in good yield and without the disadvantages of those methods previously available. If desired, an ester of the thiol chlorohydrin may be used, the ester group being converted into a hydroxyl group before dehydrochlorination. A particular advantage is that compounds containing terminal epoxide groups (which groups are more reactive than inner epoxide groups) can be obtained without substantial amounts of by-products containing non-hydrolysable chlorine. Further, nonaromatic compounds having terminal 1,2-epoxide groups and presently of considerable importance for use in electrical insulating equipment, can readily be obtained by this method.

The present invention provides a process for preparing a sulphur-containing 1,2-epoxide which comprises: reaction of a monothiol (I) of formula

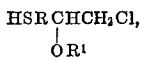

where R is a divalent organic radical and OR¹ is a hydroxyl or ester group, with a compound (II) containing at least one ethylenic double bond; when OR¹ denotes an ester group, hydrolysing this group to a hydroxyl group; and dehydrochlorinating the intermediary 1,2-chlorohydrin so obtained to form the 1,2-epoxide.

It is believed, although the usefulness of this invention does not depend on the truth of this belief, that the intermediary 1,2-chlorohydrin is formed by addition of the monothiol across the double bond, viz.

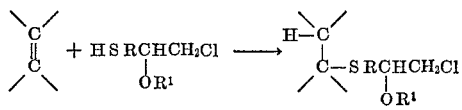

Compound (II) should not, when OR¹ in the monothiol (I) denotes hydroxyl, contain groups which react with that hydroxyl group, e.g. isocyanate or acid chloride groups. Compound (II) further should not contain groups which react readily with the 1,2-epoxide groups produced on dehydrochlorinating the intermediary 1,2-chlorohydrin, because the product will generally be unstable. Such groups include primary or secondary amino, phenolic hydroxyl, free carboxylic, acyl halide, sulphonyl halide, and acid anhydride groups.

Reaction between the monothiol (I) and the compound (II) to form the intermediary 1,2-chlorohydrin is conveniently effected by heating the two together, suitably at a temperature within the range 25° C. to 150° C., especially 50° C. to 125° C. It may be desirable to add a free-radical catalyst, e.g. a hydrazine such as hydrazine hydrochloride, an aliphatic azo compound such as α,α'-azo-diisobutyronitrile, an organometallic compound such as tetraethyl lead, an organic peroxide or an organic hydroperoxide such as benzoyl peroxide, lauroyl peroxide, cumene hydroperoxide, tert.butyl hydroperoxide or paramenthane hydroperoxide. The mixture may also be subjected to actinic irradiation. The reaction may be carried out in an inert solvent such as benzene or toluene.

The amount of monothiol (I) used may be varied within wide limits: usually it will be employed in a quantity sufficient to supply at least 0.9 and preferably from 1 to 2, thiol group equivalents per ethylenic double bond in compound (II). If compound (II) contains two or more ethylenic double bonds per molecule, a stoichiometric deficit of (I) may be employed to obtain an unsaturated epoxide.

Conversion of the intermediary 1,2-chlorohydrin to the 1,2-epoxide is carried out by the usual methods for such a dehydrochlorination, conveniently by contacting with an alkali metal hydroxide in aqueous solution, but an alcoholic or aqueous-alcoholic solution may also be used. It is generally desirable to carry out the dehydrochlorination at a temperature within the range 30° C. to 80° C.

R in the formula of the monothiol (I) may, for example, denote a radical linked by a carbon atom to the indicated —SH group and by the same or a different carbon atom to the indicated

group. Preferably R denotes a saturated alkylene group which contains from one to ten carbon atoms and which may contain one or more oxygen and/or one or more sulphur atoms in the alkylene chain, or a saturated alicyclic group containing one to three carbocyclic rings and from five to twelve carbon atoms.

Preferably OR¹ denotes a hydroxyl group, but it may also denote an ester group XCOO— or XSO₃—, where X is an alkyl, cycloalkyl, aryl or aralkyl residue.

The particularly preferred monothiol (I) is 3-mercapto-1-chloropropan-2-ol (also known as "thiochlorohydrin"), but other compounds which may be used include those of the formulae:

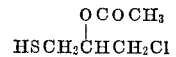

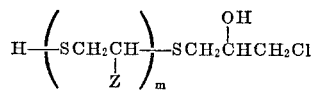

(where Z denotes hydrogen or lower alkyl and m is an integer of value 1 or more)

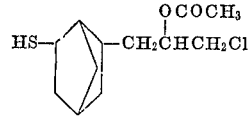

To prepare a monoepoxide, the compound (II) employed preferably contains only one ethylenic double bond, although a polyolefin may be used if the amount of the monothiol (I) is such that, on average, at least one ethylenic double bond per molecule of compound (II) remains unchanged. Ethylenically-unsaturated mono- and poly-epoxides may thus be prepared. Compound (II) preferably contains at least three carbon atoms, and it may contain hydrogen, halogen, oxygen (which may be present in, e.g., alcoholic hydroxyl, aldehyde, amide, ester, ether, cyclic ether, acetal, ketal, ketone or lactone groups), and nitrogen (which may be present in, e.g., amide, tertiary amine, imide or quaternary ammonium groups).

The mono-olefine may be aliphatic, e.g., hexene, 2-ethylhexene, allyl chloride, acrolein, acrylamide, vinyl acetate, n-butyl allyl ether, crotyl alcohol, and isobutyl vinyl ketone.

The mono-olefine may be cycloaliphatic and suitably contain not more than two carbocyclic groups, e.g., cyclohexene, bicyclo[2.2.1]hept-2-ene, cyclohexene-3-carboxaldehyde, isophorone, or 1,1-bis(hydroxymethyl)cyclohex-3-ene.

The mono-olefine may also contain at least one, but suitably not more than two, aromatic carbocyclic rings, such as styrene or stilbene.

To prepare a polyepoxide, the compound (II) used may contain at least one ethylenic double bond and at least one 1,2-chlorohydrin group (which group is dehydrochlorinated to a 1,2-epoxide group); or at least one ethylenic double bond and at least one 1,2-epoxide group; or it may contain two or more ethylenic double bonds.

There may thus be used an olefine containing at least one 1,2-chlorohydrin group, which group is dehydrochlorinated to a 1,2-epoxide group, especially an acyclic, monocyclic or polycyclic compound containing from five to twenty five carbon atoms, but not more than two ethylenic double bonds and not more than two 1,2-chlorohydrin groups; it may contain hydrogen, halogen, oxygen (which may be present in, e.g., acetal, alcoholic hydroxyl, aldehyde, amide, ester, ether, cyclic ether, ketal, ketone or lactone groups), and nitrogen (which may be present in e.g., amide, tertiary amine, imide or quaternary ammonium groups). Examples of such ethylenic 1,2-chlorohydrins are bicyclo[2.2.1]hept-5-en-2-ylmethyl 3-chloro-2-hydroxypropyl ether, bicyclo[2.2.1]hept-5-en-2-ylmethyl 3-chloro-2-acetoxypropyl ether, cyclohex-3-enylmethyl 3-chloro-2-hydroxypropyl and 2-(3-chloro-2-hydroxypropyl)ethoxy ethers, and the bis(3-chloro-2-hydroxypropyl) ether of 1,1-bis(hydroxymethyl)cyclohex-3-ene.

There may also be used an olefine containing at least one 1,2-epoxide group, especially an acyclic, monocyclic or polycyclic compound containing from five to twenty five carbon atoms but not more than two ethylenic double bonds and not more than two 1,2-epoxide groups; it may contain hydrogen, halogen, oxygen (which may be present in e.g., acetal, alcoholic hydroxyl, aldehyde, amide, ester, ether, cyclic ether, ketal, ketone or lactone groups), and nitrogen (which may be present in e.g., amide, tertiary amine, imide or quaternary ammonium groups). Examples of such unsaturated 1,2-epoxides are bicyclo[2.2.1]hept-5-en-2-ylmethyl glycidyl ether, allyl glycidyl ether, glycidyl acrylate, glycidyl methacrylate, glycidyl cyclohex-3-enecarboxylate, allyl 2,3-epoxybutyrate, and 3-vinyl-8,9-epoxy-2,4-dioxaspiro[5.5]undecane.

There may also be used an acyclic, monocyclic or polycyclic olefine containing from five to twenty five carbon atoms and from two to four ethylenic double bonds; it may contain hydrogen, halogen, oxygen (which may be present in e.g., acetal, alcoholic hydroxyl, aldehyde, amide, ester, ether, cyclic ether, ketal, ketone or lactone groups), and nitrogen (which may be present in, e.g., amide, tertiary amine, imide or quaternary ammonium groups). Examples of such polyolefines are poly(butadiene), poly(isoprene), poly(cyclopentadiene), cyclopentadiene, cyclohexa-1,3-and 1,4-dienes, vinylcyclohexene, cyclo-octa-1,5-diene, cyclododeca-1,5,9-triene, bicyclo[2.2.1]hepta-2,5-diene (norbornylene), dicyclopentadiene, diallyl phthalate, cyclohex-3-enylmethyl cyclohex-3'-enecarboxylate and its 6,6'-dimethyl derivative, tetracyclo[6.2.1$^{1,8}$ 1$^{3,6}$0$^{2,7}$]dodeca-4,9-diene, 3-vinyl- and 3-(cyclohex-3-enyl)-2,4-dioxaspiro[5.5]undec-8-ene, 3,8-divinyl- or 3,8-di(cyclohex-3-enyl)-2,4,7,9 - tetraoxospiro[5.5]undecane, divinylbenzene, and bis(cyclopent-2-enyl) ether.

The ethylenic double bond or bonds in compound (II) may be present as alkenoxymethyl groups directly attached to nitrogen, and of particular interest are compounds wherein the nitrogen is directly attached to a 1,3,5-triazine nucleus or to a —CO-group. There may thus be used melamine-formaldehyde condensation products or urea-formaldehyde condensation products in which at least one hydroxymethyl group is etherified by an alkenoxymethyl group, e.g., a hexamethylol melamine in which one or more of the hydroxymethyl groups has been esterified with allyl alcohol or but-2-en-1-ol, or bis (N-allyloxymethyl) urea. There may also be used such ethers of cyclic urea compounds, e.g., those of formula

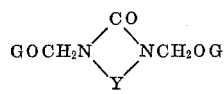

where Y is

—CH$_2$CH$_2$—, —CH$_2$CH$_2$CH$_2$—, —CH$_2$OCH$_2$—, —CH$_2$CH—,
$\qquad\qquad\qquad\qquad\qquad\qquad\qquad\qquad\qquad\qquad\quad$|
$\qquad\qquad\qquad\qquad\qquad\qquad\qquad\qquad\qquad\qquad\quad$CH$_3$

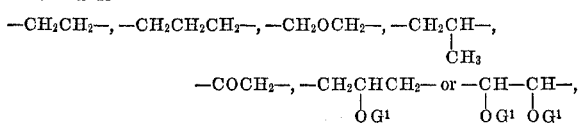

where G and G$^1$ are each hydrogen, alkyl or alkenyl, at least one of G being alkenyl. Examples of such compounds are N,N'-bis(allyloxymethyl) uron and N-allyloxymethyl-N'-hydroxymethylethyleneurea.

If the ethylenic bond is present in an alkenoxymethyl group directly attached to nitrogen, the alkenoxymethyl group containing less than eight carbon atoms and the nitrogen being directly attached to a 1,3,5-triazine nucleus or to a —CO-group, then, addition of the monothiol (I) to the double bond or bonds in compound (II) may be accompanied by a transetherification reaction which may be represented as

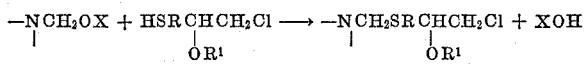

(where X denotes an alkenyl group). This side-reaction is particularly likely to take place if the mixture contains a strong acid or other transetherification catalyst; its occurrence is, however, not disadvantageous, since a 1,2-chlorohydrin (which can be converted into a 1,2-epoxide by conventional means) is produced.

The particularly preferred compounds (II) are those containing at least one terminal ethylenic double bond, especially those of formula

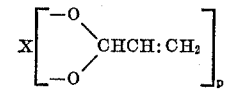

where p is 1, 2 or 3, and X is an organic radical of valency 2p, or compounds containing at least one bicyclo[2.2.1]hept-2-ene ring, especially dicyclopentadiene and compounds of formula

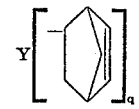

where q is 1, 2 or 3, and Y is hydrogen or a q-valent organic radical.

It is known that epichlorohydrin will react with arylthiols, alkyl thiols and arylene dithiols in the presence of a hydrogen chloride acceptor to form compounds containing groups of formula

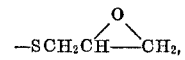

but such reaction of compounds containing two or more mercaptan groups directly attached to an aliphatic or cycloaliphatic nucleus has not been explicitly described. A disadvantage of that procedure is that compounds containing two or more mercaptan groups directly attached to an aliphatic, cycloaliphatic or aromatic group are not readily accessible. A second disadvantage is that the S-glycidyl compound may react with unconsumed mercaptan, Q$^2$SH, thus:

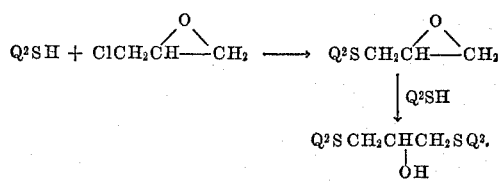

The following mono-1,2-epoxides and poly-1,2-epoxides are believed to be new.

(a) Compounds containing, per molecule, at least one ethylenic double bond and, directly attached to carbon, at least one group of formula

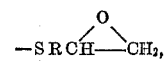

where R has the meaning previously assigned.

(b) Those compounds containing, directly attached to carbon, at least one group of formula

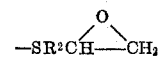

where R$^2$ is a divalent radical containing two or more carbon atoms, which may be linked by one of its carbon atoms to the indicated —S atom and by the same or a different carbon atom to the indicated

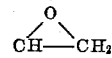

group, particularly those compounds wherein R$^2$ denotes either a saturated alkylene group which may contain one or more oxygen atoms and/or one or more sulphur atoms in the alkylene group and which contains not more than ten carbon atoms, or a saturated alicyclic group containing one to three carbocyclic rings and from five to twelve carbon atoms. The preferred compounds contain, directly attached to different carbon atoms, two groups of formula

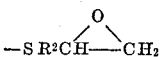

where the two $R^2$ are the same. (It is known to react mercaptans with 1-chloro-3,4-epoxybutane: the products are S-oxetyl compounds, containing the group of formula

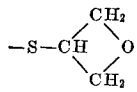

and not the S-(3,4-epoxybutyl) group.)

(c) Those compounds containing, directly attached to a carbon atom, a group of formula

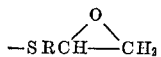

and another 1,2-epoxide group of formula

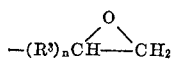

directly attached to the same or a different carbon atom, to a nitrogen atom or to an oxygen atom, where R has the meanings previously assigned, $R^3$ represents a divalent radical containing one or more carbon atoms and $n$ is 1 or 0; preferably $R^3$ denotes —$CH_2$— and $n$ is 1.

(d) Those containing, per molecule, at least one group of formula

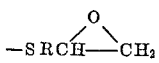

directly attached to carbon, and, directly attached to the same or to a different carbon atom, to a nitrogen atom or to an oxygen atom, a group of formula

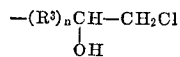

where R, $R^3$ and $n$ have the meanings previously assigned.

(e) Compounds containing, directly attached to the same or different carbon atom of an aliphatic chain or cycloaliphatic nucleus, two or more groups of formula

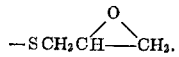

The particularly preferred epoxides of the present invention are those of formula

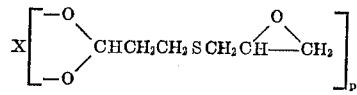

or

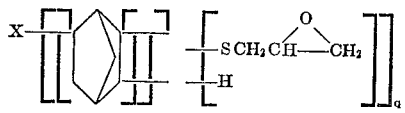

where $p$, $q$, X and Y have the meanings previously assigned, or

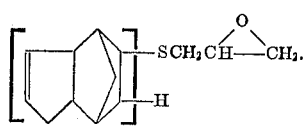

The corresponding 1,2-chlorohydrins are also believed to be new, i.e. those containing (f) At least one ethylenic double bond and, directly attached to carbon, at least one group of formula

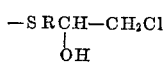

(g) Directly attached to carbon, at least one group of formula

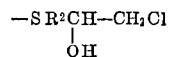

(h) Directly attached to carbon, at least one group of formula

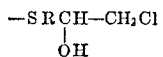

and, directly attached to the same or a different carbon atom, to a nitrogen atom or to an oxygen atom, a group of formula

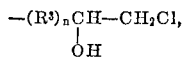

where R, $R^2$, $R^3$ and $n$ have the meanings previously assigned, (i) Directly attached to the same or different carbon atoms or an aliphatic chain or cycloaliphatic nucleus, two or more groups of formula

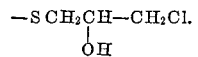

The mono-epoxide and poly-epoxides of this invention may be used to stabilise chlorine-containing organic resins such as poly(vinyl chloride) against the degradative effects of heat and light; and for treatment of cellulosic textiles to impart mechanical finishing, creaseproofing and other effects.

The mono-epoxides may also be used as reactive diluents in curable epoxide resin compositions. The polyepoxides react with the usual curing agents for epoxide resins and can therefore be cured, i.e. converted into cross-linked, insoluble, infusible bodies, by reaction with such curing agents.

Accordingly, there are also provided curable compositions comprising an epoxide resin, a curing agent therefor, and a mono-1,2-epoxide of the present invention, and curable compositions comprising a polyepoxide of this invention and a curing agent for epoxide resins.

The curing (or hardening) agent may be a cross-linking agent such as a polyamine, e.g. aliphatic polyamines such as diethylenetriamine, triethylenetetramine, N-(2-hydroxyethyl)-, N-(2-hydroxypropyl)- and N-(2-cyanoethyl)-diethylenetriamine, tetraethylenepentamine, propane-1,2-diamine, propane-1,3-diamine, and 2,2,4- and 2,3,3-trimethylhexane-1,6-diamines; cycloaliphatic polyamines such as bis(4-aminocyclohexyl)methane, bis(4-amino-3-methylcyclohexyl)methane, 2,2-bis(4-aminocyclohexyl)propane, and 3-aminomethyl-3,5,5-trimethylcyclohexylamine (isophoronediamine); aromatic polyamines such as bis-(4-aminophenyl)methane, aniline-formaldehyde resins, bis(4-aminophenyl) sulphone, and p- and m-phenylenediamines; and heterocyclic polyamines such as N-(2-aminoethyl)-piperazine. There may also be used poly(aminoamides), e.g. those prepared from aliphatic polyamines and dimerised or trimerised fatty acids; dicyandiamide; polycarboxylic acid anhydrides such as phthalic anhydride, 1,2,3,6-tetrahydrophthalic anhydride, methyl-1,2,3,6-tetrahydrophthalic anhydride, methylendomethylene-1,2,3,6-tetrahydrophthalic anhydride, hexahydrophthalic anhydride, benzophenone - 3,3',4,4'-tetracarboxylic acid dianhydride, pyromellitic dianhydride, maleic anhydride, succinic anhydride, dodecenylsuccinic anhydride, nonenylsuccinic anhydride, polysebacic anhydride and polyazelaic anhydride, as well as polycarboxylic acids such as phthalic acid, 1,2,3,6-tetrahydrophthalic acid, hexahydrophthalic acid, isophthalic acid, terephthalic acid, adipic acid, succinic acid, dodecenylsuccinic acid, maleic acid, citric acid, mellitic acid and pyromellitic acid; and polyhydric phenols such as resorcinol, hydroquinone, 2,2-bis(4-hydroxyphenyl) propane and resins formed between formaldehyde and phenols such as phenol itself or p-chlorophenol.

There may also be used catalytic curing agents, including tertiary amines such as 2,4,6-tris(dimethylaminomethyl)phenol, n-benzyldimethylamine, triethanolamine; alkali metal alkoxides of alcohols such as 2,4-dihydroxy-3-hydroxymethylpentane; stannous salts of alkanoic acids, such as stannous octoate; and Friedel-Crafts catalysts such as boron trifluoride and its complexes.

The preferred curing agents are polycarboxylic acid anhydrides, which are normally used in a proportion such as to supply from 0.7 to 1.2 carboxylic acid anhydride equivalents per 1,2-epoxide group of the polyepoxide; polyamines, which are normally used in a proportion such as to supply from 0.8 to 1.2 amino-hydrogen equivalents per 1,2-epoxide group of the polyepoxide; and tertiary amine curing agents, present in quantity sufficient to convert the polyepoxide into an infusible, insoluble product.

The aforesaid curable compositions may contain other epoxide resins, especially those wherein the 1,2-epoxide groups are terminal and of formula

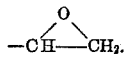

Such resins include, for example, polyglycidyl esters obtainable by the reaction of a substance containing two or more carboxylic acid groups with epichlorohydrin or glycerol dichlorohydrin in the presence of an alkali. Such polyglycidyl esters may be derived from aliphatic carboxylic acids, e.g. oxalic acid, succinic acid, adipic acid, sebacic acid, or dimerised or trimerised linoleic acid; from cycloaliphatic carboxylic acids such as hexahydrophthalic and tetrahydrophthalic acid; and from aromatic carboxylic acids such as phthalic acid, isophthalic acid and terephthalic acid.

Other epoxide resins which may be used include polyglycidyl ethers, such as those obtainable by the reaction of a substance containing two or more alcoholic hydroxyl groups, or two or more phenolic hydroxyl groups, with epichlorohydrin or glycerol dichlorohydrin under alkaline conditions or, alternatively, in the presence of an acidic catalyst with subsequent treatment with alkali. Such polyglycidyl ethers may be prepared from aliphatic alcohols, for example, ethylene glycol and poly(oxyethylene) glycols such as diethylene glycol and triethylene glycol, propylene glycol and poly(oxypropylene) glycols, propane-1,3-diol, butane-1,4-diol, poly(oxybutylene) glycols, pentane-1,5-diol, hexane-1,6-diol, hexane-2,4,6-triol, glycerol, 1,1,1-trimethylolpropane, pentaerythritol and poly(epichlorohydrin); from cycloaliphatic alcohols, such as quinitol, resorcitol, bis(4-hydroxycyclohexyl)methane and 2,2-bis(4-hydroxycyclohexyl)propane; and from alcohols containing aromatic nuclei, such as adducts of alkylene oxides with amines, e.g. N,N-bis(2-hydroxyethyl) aniline and 4,4'-bis(2-hydroxyethylamino)diphenylmethane, or with phenols, e.g. 2,2-bis(p-(2-hydroxyethoxy)phenyl) propane or 2,2 - bis(p - hydroxypropoxyphenyl)propane. Preferably the polyglycidyl ethers are derived from a substance containing two or more phenolic hydroxyl groups, for example, resorcinol, catechol, hydroquinone, bis(4-hydroxyphenyl)methane, 1,1,2,2 - tetrakis(4 - hydroxyphenyl)ethane, novolacs formed between aldehydes such as acetaldehyde, chloral or furfuraldehyde and phenols such as phenol itself, p-chlorophenol, p-cresol or p-tert. butylphenol, 4,4' - dihydroxydiphenyl, bis(4 - hydroxyphenyl) sulphone, and, especially phenol-formaldehyde novolac resins or 2,2 - bis(4 - hydroxyphenyl)propane (otherwise known as bisphenol A).

There may further be employed poly(N-glycidyl) compounds, such as are, for example, obtained by the dehydrohalogenation of the reaction products of epichlorohydrin and amines containing at least two hydrogen atoms directly attached to nitrogen, such as aniline, n-butylamine, bis(4-aminophenyl)methane, bis(4-aminophenyl) sulphone, or bis(4-methylaminophenyl)methane. Other poly(N-glycidyl) compounds that may be used include triglycidyl isocyanurate, N,N'-diglycidyl derivatives of cyclic alkylene ureas such as ethyleneurea and 1,3-propyleneurea, and N,N'-diglycidyl derivatives of hydantoins such as 5,5-dimethylhydantoin.

Polyepoxides having terminal 1,2-epoxide groups attached to different kinds of atoms may be employed, e.g. the N,N,O-triglycidyl derivative of p-aminophenol, or glycidyl esters-glycidyl ethers of substances such as salicyclic acid, 4,4-bis(p-hydroxyphenyl)pentanoic acid, or phenolphthalein.

Other epoxy resins may contain at least one 1,2-epoxide group which is not terminal, such as vinylcyclohexene dioxide, limonene dioxide, dicyclopentadiene dioxide, 3,4-epoxydihydrodicyclopentadienyl) glycidyl ether, the bis(3,4-epoxydihydrodicyclopentadienyl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, the cyclic acetal formed between 3,4-epoxycyclohexanecarboxaldehyde and 1,1-bis(hydroxymethyl-3,4-epoxycyclohexane, bis(epoxycyclopentyl) ether, and epoxidised butadienes or copolymers of butadiene with ethylenic compounds such as styrene and vinyl acetate.

The curable compositions may contain reactive diluents, fillers, plasticisers, suspending agents or colouring agents. They may be used, e.g. as casting, potting, encapsulating, coating or adhesive resins.

The following Examples illustrate the invention. 1,2-chlorohydrin contents were determined by titration with 0.5 N-methanolic sodium methoxide, thiol contents by titration in isopropanol with 0.1 N-aqueous iodine, and 1,2-epoxide contents by titration with 0.1 N-perchloric acid in glacial acetic acid in the presence of tetraethylammonium bromide as catalyst, crystal violet being used as indicator. 3-chloro-1-mercaptopropan-2-ol was prepared as described by Sjöberg, Ber. deutsch. Chem. Ges., 1941, 74B, 64. Unless otherwise indicated, heat distortion temperatures were measured by a modification of the Martens D.I.N. procedure in which a smaller sample, viz. 76 mm. x 19 mm. x 3.2 mm. (compared with a sample size of 120 mm. x 15 mm. x 10 mm. specified in the D.I.N. procedure), and a maximum, fibre stress of 12.5 kg./sq. cm. (compared with the specified 50 kg./sq. cm.) were employed. Such results, while not exactly equivalent to those which would be obtained by the D.I.N. procedure, are, however, mutually comparable.

Parts are by weight.

EXAMPLE I

Epichlorohydrin (92.5 g., 1 mole) was added slowly to allyl alcohol (174 g., 3 moles) containing boron trifluoride etherate (1 ml.) with stirring at 60° C. The mixture was stirred at 60° C. for 1 hour, and then distilled, 121.8 g. (80.9%) of allyl 3-chloro-2-hydroxypropyl ether (b.pt. 77° C./1 mm. Hg) being collected. This intermediate (75.25 g., 0.5 mole) was heated for 5 hours to 170–180° C. with dicyclopentadiene (66 g., 0.5 mole), then unchanged dicyclopentadiene was distilled off. The fraction boiling at 100° C./0.05 mm. Hg was collected; it weighed 49.4 g., corresponding to a 45.6% yield of bicyclo[2,2,1]hept - 5 - en -2 -ylmethyl 3 - chloro - 2 - hydroxypropyl ether and had a 1,2-chlorohydrin content of 4.22 equiv./kg. (93.5% of the calculated amount).

This product (43.6 g., 0.20 mole) was heated for 1 hour at 60° C. with 3-chloro-1-mercaptopropan-2-ol (23.4 g., 0.185 mole) in the presence of 0.1 g. of α,α'-azo-diisobutyronitrile. The thiol content of the mixture was then 0.29 equiv./kg., the initial value being 3.61 equiv./kg. The mixture was heated at 60° C. with a solution of sodium hydroxide (27 g.) in water (60 ml.) for 75 minutes, the separated organic layer was diluted with benzene, washed with water, dried with anhydrous magnesium sulphate, filtered, and then heated at 100° C./0.1 mm. Hg. The residue was a yellow liquid, consisting essentially of the substance of formula A

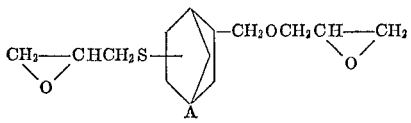

and believed to be a mixture of the two isomers of formulae

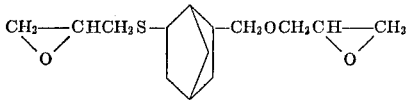

and

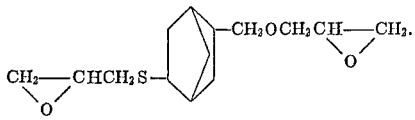

The yield was 43.2 g. (77.3% of theory): the product contained 5.68 epoxide equiv./kg. (80% of the calculated value) but the 1,2-chlorohydrin content was only 0.03 equiv./kg.

A tough cured product having a heat distortion point of 80° C. was obtained by heating 100 parts of the diepoxide with 90 parts of hexahydrophthalic anhydride for 4 hours at 100° C.

A further quantity of 100 parts of the diepoxide was cured with 90 parts of hexahydrophthalic anhydride by heating for 2 hours at 70° C., 2 hours at 100° C., and then for 18 hours at 140° C. The arc resistance of the cured product, measured according to DIN 53,484, was excellent (stage L4), and the tracking resistance, measured according to DIN 53,480, had the highest rating, KA3C. Other electrical properties, determined according to British Standards Specification 2782, were:

Breakdown strength _____kilovolts/cm__ 90
Volume resistivity _____ohms-cm__ $10^{15.4}$
Surface resistivity _____ohms__ $10^{14.5}$
Tan δ at 50 cycles/second _____ 0.03

A mixture of 100 parts of the diepoxide and 14 parts of triethylenetetramine, on being cured for seven days at room temperature, formed a tough product having a heat distortion point of 56° C. A further quantity of the diepoxide (100 parts) was heated with 25 parts of isophoronediamine at 100° C. for 4 hours, forming a tough casting with a heat distortion point of 79° C.

EXAMPLE II

A product, essentially the same as that described in Example I, was also prepared in the following manner.

Allyl glycidyl ether (57 g., 0.5 mole) and dicyclopentadiene (33.1 g., 0.25 mole) were heated at 170–180° C. for 24 hours, and the mixture fractionally distilled to yield 32.5 g. (36% of theory) of bicyclo[2,2,1]hept-5-en-2-ylmethyl glycidyl ether. This intermediate (3.7 g., 0.03 mole) and 3-chloro-1-mercaptopropan-2-ol (5.4 g., 0.03 mole) were stirred together at 60° C. for 1 hour, at which time the thiol content of the reaction mixture was less than 0.01 equiv./kg. (initial value 3.61 equiv./kg.). The crude product was dehydrochlorinated by treatment with a solution of sodium hydroxide (1.6 g.) in water (3.5 ml.) at 60° C. for 75 minutes, and the desired product isolated as described in Example I. There was obtained 4.4 g. of a dark yellow liquid having an epoxide content of 4.48 equiv./kg. (60.7% of theory) and a 1,2-chlorohydrin content of 0.12 equiv./kg.

EXAMPLE III

3 - chloro - 1 - mercaptopropan-2-ol (36.8 g., 0.29 mole) was added dropwise to norbornadiene (13.4 g., 0.145 mole) at 60° C. with stirring, and the mixture was stirred at that temperature for a further hour. The thiol content of the mixture at this stage was 1.80 equiv./kg., the initial value being 5.82 equiv./kg. On heating at 100° C. under a vacuum of 0.1 mm. Hg, 12 g. of 3-chloro-1-mercaptopropan-2-ol was recovered. The chlorohydrin content of the viscous liquid remaining was 4.98 equiv./kg., indicating formation of the mono-adduct of formula B (calculated chlorohydrin content, 4.58 equiv./kg.) and a bis-adduct of formula C (calculated chlorohydrin content, 5.80 equiv./kg.) in a 2:1 molar ratio.

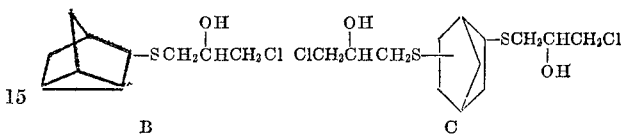

The bis-adduct is likewise believed to be a mixture of the isomers of formulae

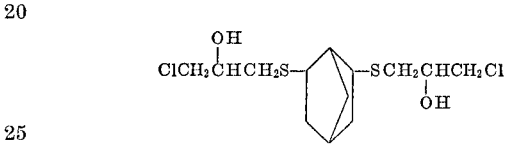

and

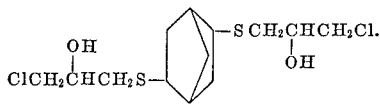

A mixture of these adducts, prepared in the same manner but having chlorohydrin content of 4.25 equiv./kg. (64.8 g.), was dissolved in 50 ml. of benzene and stirred at 60° C. for 18 hours with a solution of sodium hydroxide (16.5 g.) in water (33 ml.). The mixture was then cooled and allowed to separate. The benzene layer was washed with water until neutral, dried with anhydrous magnesium sulphate, filtered, and heated at 100° C. under a vacuum of 1 mm. Hg to give a yellow viscous liquid having a 1,2-epoxide content of 2.69 equiv./kg. (50.5%, calculated on the initial chlorohydrin content).

EXAMPLE IV

A solution of 3,8-divinyl-2,4,7,9-tetraoxaspiro [5,5] undecane (21.2 g., 0.1 mole) and toluene-p-sulphonic acid (0.2 g.) in 50 ml. of benzene was added slowly over 25 minutes to a stirred solution, held at 60° C., of 3-chloro-1-mercaptopropan-2-ol (25.3 g., 0.2 mole) in benzene (65 ml.) through which nitrogen was being bubbled. The mixture was allowed to cool for 14 hours, at which time the thiol content had decreased to 0.02 equiv./kg. After the mixture had been washed with water (2× 50 ml.) and dried with anhydrous magnesium sulphate, it was heated at 100° C./1 mm. Hg to remove solvent. There remained 41.6 g. (89.5% of theory) of an orange viscous liquid having a 1,2-chlorohydrin content of 4,5 equiv./kg. (calculated for the bischlorohydrin, 4.31 equiv./kg.).

This chlorohydrin (40 g., 0.174 equiv.) was dissolved in isopropanol (100 ml.) and to this solution at 18° C. was added over 75 minutes potassium hydroxide (9.75 g., 0.174 equiv.) in isopropanol (250 ml.). The mixture was heated to 40° C. for 45 minutes, cooled to 0° C. and carbon dioxide bubbled through to neutralise potassium hydroxide remaining, then the mixture was filtered. The filtrate was concentrated to about one-tenth of its original volume and taken up in diethyl ether (100 ml.), the ethereal extract was washed with water (2× 50 ml.), dried with anhydrous magnesium sulphate, filtered, and heated, first at 60° C. under normal pressure and then at 100° C./0.5 mm. Hg. There remained 20.6 g. (60.8%) of a clear pale yellow liquid having an epoxide content of 3.57 equiv./kg. and consisting essentially of the compound of formula

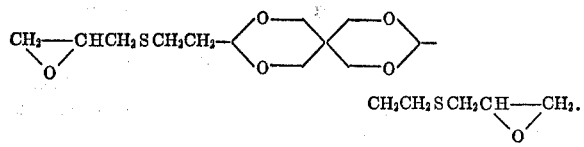

EXAMPLE V 1,4-endomethylenecyclohex-5-en-2-ylmethyl 1,4-endomethylenecyclohex-5-en-2-ylmethyl 1,4 - endomethylenecyclohex-5-ene-2-carboxylate was prepared by a Tiskchenko reaction from bicyclo[2,2,1]hept-5-ene-2-carboxaldehyde.

The aldehyde (200 g.) was heated at 60° C. and aluminium isopropoxide (0.6 g.) was added, the addition causing the temperature to rise to 85° C. The mixture was cooled to 20° C., and then fractionally distilled to yield 40 g. of unchanged aldehyde and 145.5 g. (72.8%) of the required ester, boiling at 120° C./0.2 mm. Hg.

This ester, a white solid (46.0 g., 0.188 mole) was dissolved in 200 ml. of toluene and stirred at 90° C. in an atmosphere of nitrogen. A solution of 0.2 g. α,α'-azo-di-isobutyronitrile in 42.1 g. (0.33 mole) of 3-chloro-1-mercaptopropan -2-ol was added dropwise, the maximum temperature during addition being 97° C. The mixture was cooled to 20° C., when its thiol value was found to be 0.185 equiv./kg., indicating that 84.5% of the thiochlorohydrin had been consumed. Solvent was then removed by heating the mixture at 100° C./0.2 mm. Hg. The residue was dissolved in 200 ml. of isopropanol and stirred at 20° C. while a solution of 20 g. of potassium hydroxide in 500 ml. of isopropanol was added slowly over 40 minutes, the maximum temperature during addition being 26° C. Next, the mixture was cooled to 5° C., filtered, and stripped of isopropanol by heating at 100° C./14 mm. Hg. The resulting resin was dissolved in 200 ml. of toluene, washed to pH 7 with water, dried with anhydrous magnesium sulphate, filtered, and the solvent removed by heating at 100° C./1 mm. Hg. There remained 42.6 g. (60.3%) of a yellow viscous liquid containing 3.41 epoxide equiv./kg. (72.4%). This product is considered to be a mixture of the three isomers of formulae

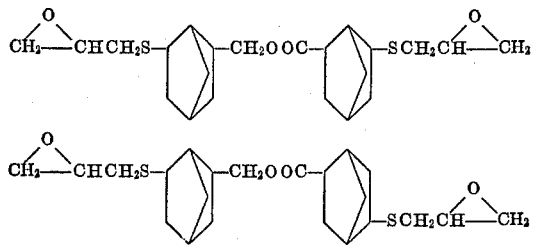

and

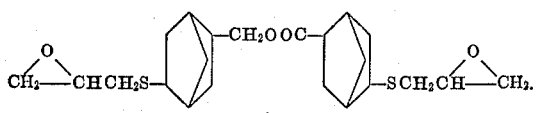

EXAMPLE VI

A product containing three bicyclo[2,2,1]hept-5-ene groups per molecule was prepared as follows:

Butane-1,4-diol (18 g., 0.2 mole), 150 ml. of toluene and 1 ml. of boron trifluoride etherate were stirred at 60° C., and 108 g. (0.6 mole) of bicyclo 2,2,1 hept-5-en-2-ylmethyl glycidyl ether (prepared as in Example II) was added over a period of 75 minutes, the maximum temperature during addition being 75° C. The mixture was cooled to 21° C., washed with saturated aqueous sodium chloride solution, dried with anhydrous magnesium sulphate, filtered, and stripped at 100° C./0.4 mm. Hg to leave 114.6 g. (82.4%) of a clear yellow liquid, presumed to be essentially a mixture of the isomers of formula

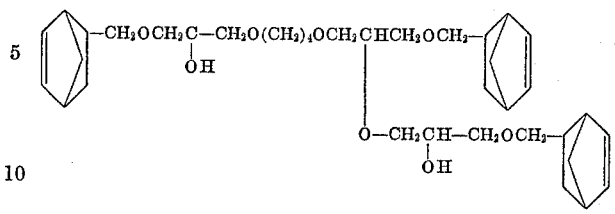

A 52.5 g. portion of this product and 200 ml. of toluene were stirred at 90° C. in an atmosphere of nitrogen and a solution of 0.2 g. of α,α'-azodi-isobutyronitrile in 31.6 g. (0.25 mole) of 3-chloro-1-mercaptopropan-2-ol was added during 15 minutes, the maximum temperature attained being 93° C. The mixture was cooled to 20° C., when titration indicated that 93.5% of the thiochlorohydrin had been consumed. Next, the mixture was stirred at 60° C. for 18 hours with a solution of 40 g. of sodium hydroxide in 60 ml. water, and cooled. The toluene layer which separated was washed until neutral with saturated sodium chloride solution, dried with anhydrous magnesium sulphate, filtered, and solvent removed by heating at 100° C. under vacuum, finally at 0.2 mm. Hg. There remained 61.0 g. (81.3%) of a yellow-brown resin containing 2.45 epoxide equiv./kg. (72.0%).

EXAMPLE VII

Bicyclo[2,2,1]hept-5-ene - 2 - carboxaldehyde (52.8 g., 0.433 mole and 200 ml. of toluene were heated at 90° C. under nitrogen, and 0.2 g. of α,α'-azo-di-isobutyronitrile in 54.8 g. (0.433 mole) of 3-chloro-1-mercaptopropan-2-ol was added during 15 minutes, no temperature rise occuring. The mixture was cooled to 19° C., when a thiol value of 0.05 equiv./kg. was found (calculated value assuming no mercaptan to have been consumed, 1.49 equiv./kg.). The solution was stirred at 60° C. for 16 hours with 40 g. of sodium hydroxide in 60 ml. of water, then cooled and the mixture allowed to separate. The toluene layer was washed to pH 7 with water, dried with anhydrous magnesium sulphate, filtered, and stripped of solvent at 100° C./0.4 mm. Hg to yield 65 g. (70.8%) of a golden yellow liquid containing 1.80 epoxide equiv./kg. (38.2%).

The product is believed to consist essentially of the isomers of formulae

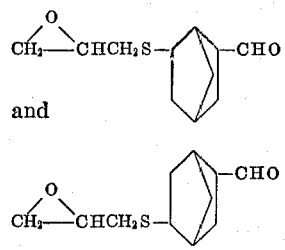

EXAMPLE VIII

In this Example, an excess of a diolefine is used so as to obtain an ethylenically-unsaturated monoepoxide.

A solution of 0.3 g. of α,α'-azo-di-isobutyronitrile in 63.25 g. (0.5 mole) of 3-chloro-1-mercaptopropan-2-ol was added over 15 minutes to a mixture of 132 g. (1.0 mole) of dicyclopentadiene and 150 ml. of toluene at 90° C., the temperature rising to 112° C. The reaction mixture was cooled to 100° C., maintained at this temperature for 60 minutes, and cooled to 20° C., when the thiol content was 0.18 equiv./kg. (calculated content, assuming no mercaptan have been consumed, 1.50 equiv./kg.). Excess dicyclopentadiene and solvent were removed by heating at 100° C./14 mm. Hg, the resulting chlorohydrin was dissolved in 150 ml. of toluene and stirred at 60° C. for 64 hours with a solution of 40 g. of sodium hydroxide in 60 ml. of water. After the mixture was cooled to 25° C., the toluene layer was separated, washed to pH 7 with water, dried with anhydrous magnesium sulphate, filtered, and the solvent removed at 100° C./0.3 mm. Hg. There remained 95.4 g. (85.9%) of a yellow-brown liquid having an epoxide content of 1.51 equiv./kg. (33.4%).

It is believed that addition occurs on the bicyclo[2,2,1]hept-2-ene moiety and that the product consists essentially of the isomers of formula

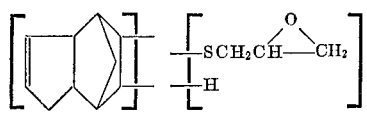

EXAMPLE IX

An addition product of propylene sulphide and 3-mercapto-1-chloro-propan-2-ol was prepared as follows:

Propylene sulphide (37 g., 0.5 mole) was added over 20 minutes with stirring to 63.25 g. (0.5 mole) of 3-mercapto-1-chloropropan-2-ol containing 0.2 ml. of boron trifluoride etherate at 60° C. in an atmosphere of nitrogen. The mixture was then heated at 100° C./14 mm. Hg to remove volatile materials, and there remained 78.3 g. (78% of theory) of the adduct, containing 5.41 thiol equiv./kg. and substantially of the formula

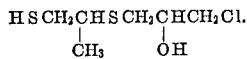

Thirty-seven grams (0.2 thiol equiv.) of this adduct, 50 ml. of toluene and 0.2 g. of toluene-p-sulphonic acid were stirred at 60° C. in nitrogen. A solution of 21.2 g. (0.1 mole) of 3,9-divinyl-2,4,8,10-tetraoxaspiro[5,5]undecane in 50 ml. of toluene was added over 20 minutes, the temperature rising to 61° C. The mixture was cooled to 21° C. and the thiol value was found to be less than 0.02 equiv./kg. (calculated value, assuming no mercaptan to have been consumed, 1.33 equiv./kg.). The toluene solution was washed with water until neutral, dried with anhydrous magnesium sulphate, and the toluene was removed by heating at 100° C./14 mm. Hg.

The residual chlorohydrin was dissolved in 150 ml. of isopropanol and stirred at 17 to 20° C. while a solution of 12.5 g. of potassium hydroxide in 350 ml. of isopropanol was added over 30 minutes. The mixture, which contained white precipitated solid, was cooled to 5° C., filtered, and the volume of the solution was reduced to about 100 ml. by heating at 60° C./14 mm. Hg. The residue was dissolved in ether, and the ethereal solution was washed with water to pH 7, dried with anhydrous magnesium sulphate, and heated, first at 45° C. to remove ether and finally at 100° C./0.4 mm. Hg. There remained 42.4 g. (83.5%) of a yellow liquid containing 2.36 epoxide equiv./kg. (60.2%) and consisting essentially of the compound of formula

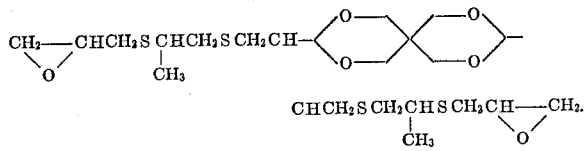

EXAMPLE X 1-chloro-3-mercaptopropan-2-ol (126.5 g., 1 mole), 116 g. (2 moles) of allyl alcohol, 500 ml. of toluene and 0.2 g. of α,α'-azo-di-isobutyronitrile were mixed at 23° C. and stirred for 2 hours in a "Hanovia 1 L" photochemical reactor (Engelhard Hanovia) which emits irradiation predominantly at 254, 265, 297, 313 and 366 mμ, the maximum temperature being 90° C. The mixture was cooled to 20° C., when the thiol value was found to be 0.11 equiv./kg., compared with an initial value of 1.37 equiv./kg. The mixture was heated at 100° C./1 mm. Hg, when there remained 168.3 g. (91.3%) of a material containing 5.08 equiv./kg. of 1,2-chlorohydrin groups (93.8%).

This chlorohydrin (40 g.) was dissolved in 150 ml. of isopropanol and stirred at 23° C. while a solution of 11.4 g. of potassium hydroxide in 300 ml. of isopropanol was added over 30 minutes. Excess alkali was removed by passing in carbon dioxide, the mixture was filtered, and the filtrate heated at 60° C./14 mm. Hg. The residue was dissolved in ether (200 ml.), washed twice with 100 ml. of water, dried, and heated at 100° C./1 mm. Hg to yield 23.3 g. (71.5%) of a yellow liquid having an epoxide content of 3.96 equiv./kg. (58.6%) and consisting essentially of the monoepoxide alcohol of formula

What we claim is:
1. A compound of the formula:

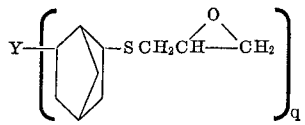

where q is an integer of at least 1, and at most 2, and Y has a valency of q and is selected from the group consisting of hydrogen, formyl, carboxylic ester group of not more than 2 carbon atoms, or a radical having the formula

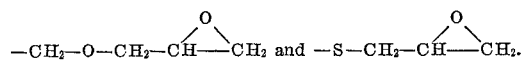

2. The compound of formula

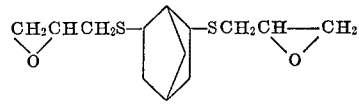

3. The compound of formula

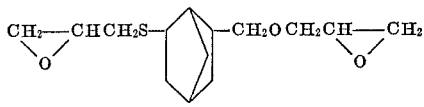

4. The compound of formula

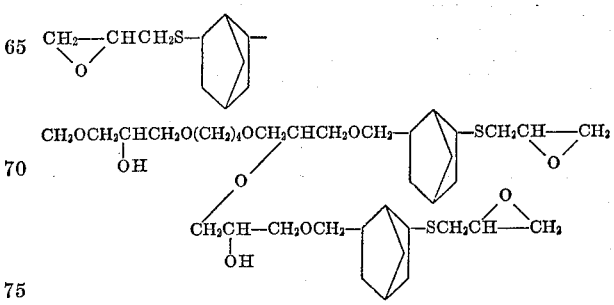

5. The compound of formula

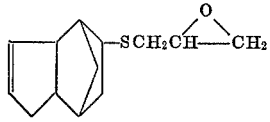

References Cited

UNITED STATES PATENTS

| | | | |
|---|---|---|---|
| 3,117,851 | 1/1964 | Dissen | 260—348 R |
| 3,345,419 | 10/1967 | Tinsley, et al. | 260—348 R |
| 3,404,102 | 10/1968 | Starcher et al. | 260—348 R |
| 3,459,775 | 8/1969 | Rick et al. | 260—348 R |

FOREIGN PATENTS

| | | |
|---|---|---|
| 853,619 | 11/1960 | Great Britain. |
| 860,285 | 2/1961 | Great Britain. |
| 981,346 | 1/1965 | Great Britain. |
| 969,126 | 9/1964 | Great Britain. |
| 1,077,964 | 8/1967 | Great Britain. |
| 1,082,104 | 9/1967 | Great Britain. |

OTHER REFERENCES

Todsen et al.: "Jour. Amer. Chem. Soc.," vol. 72, 1950, pp. 4000–2.

Reid: "Organic Chemistry of Bivalent Sulfur," vol. 2, pp. 29–32.

DONALD G. DAUS, Primary Examiner

J. H. TURNIPSEED, Assistant Examiner

U.S. Cl. X.R.

260—2 EP, 2 N, 2 BP, 45.7 R, 45.8 R, 45.8 N, 88.3 R, 98.3 A, 333, 340.7, 348 A, 609 R, 609 B, 611 R, 611 B